May 9, 1950 H. W. ROCKWELL 2,506,842
HYDRAULICALLY OPERATED CLUTCH AND BRAKE
UNIT FOR WINDING REELS
Filed Jan. 20, 1945 7 Sheets-Sheet 4
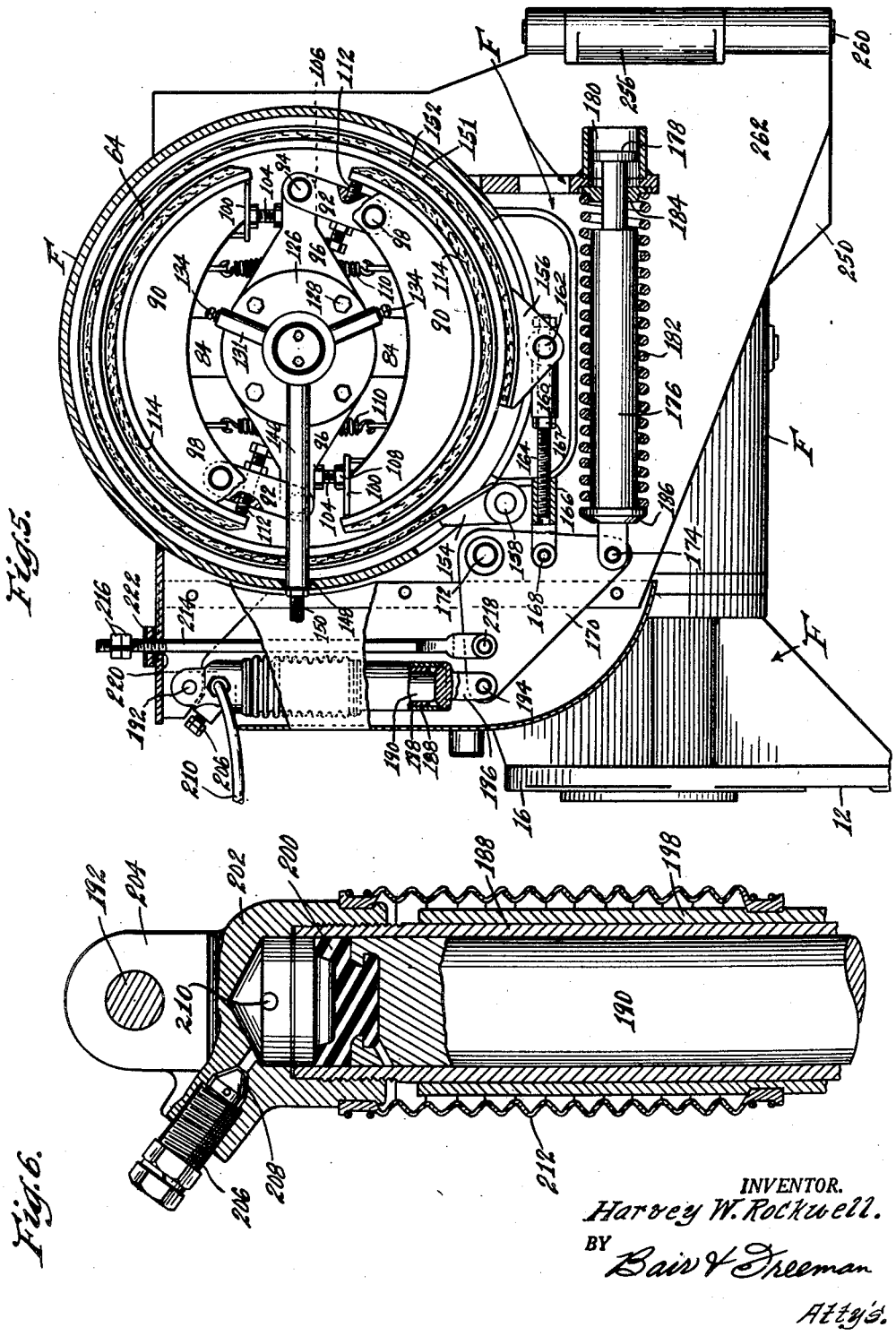
INVENTOR.
Harvey W. Rockwell.
BY Bair & Freeman
Atty's.

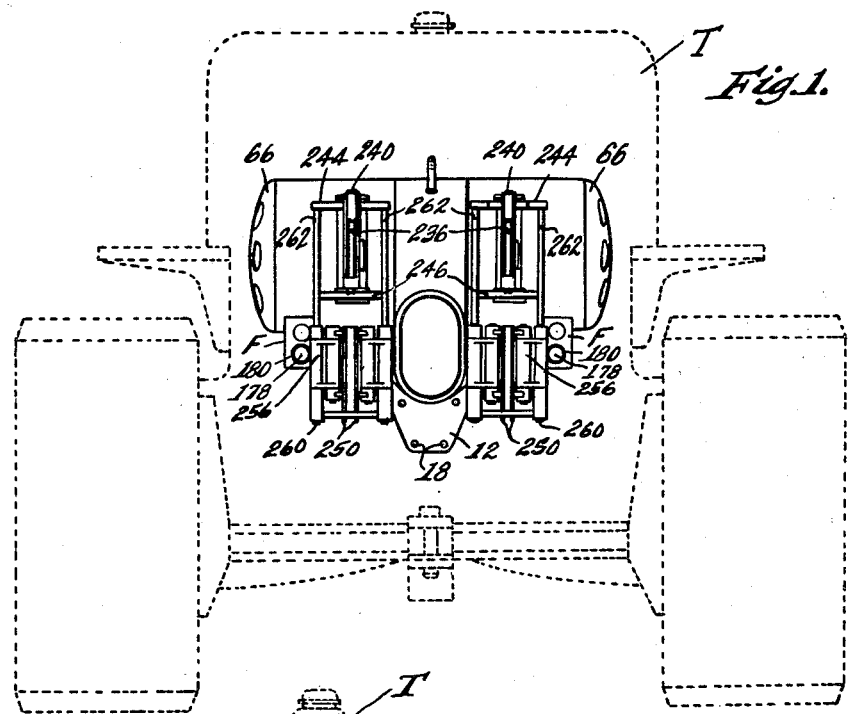
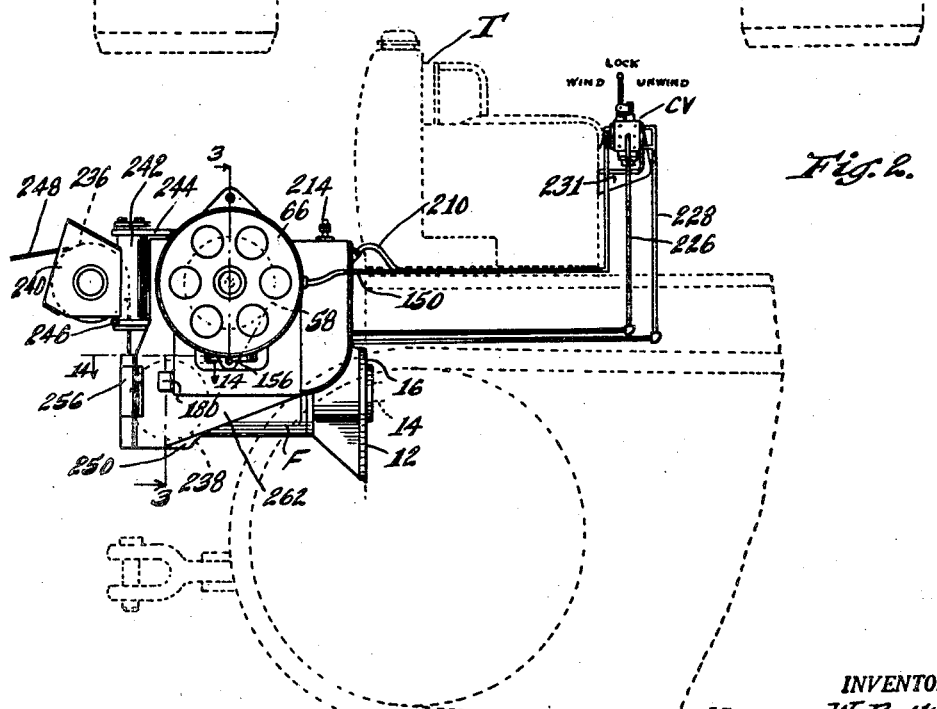

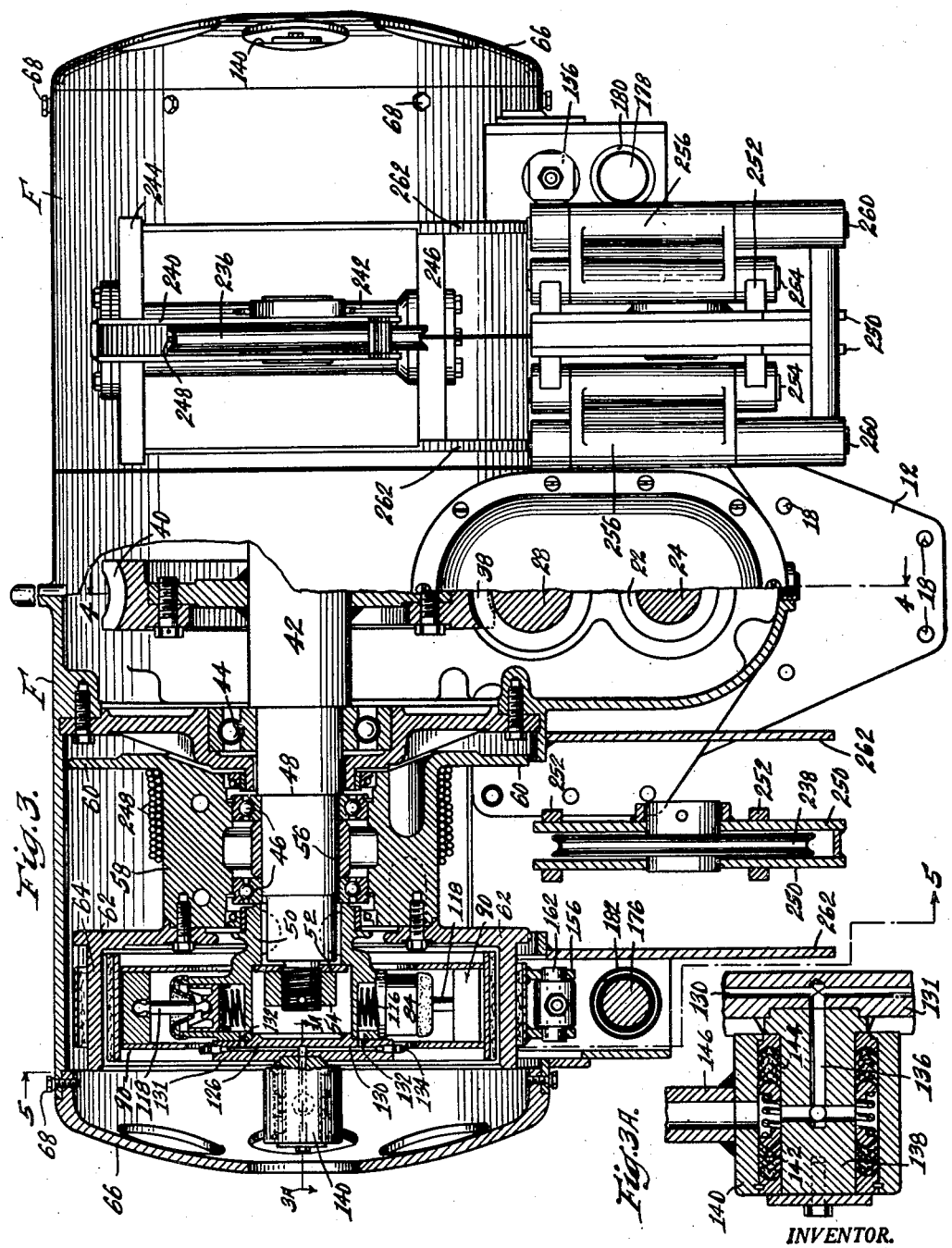

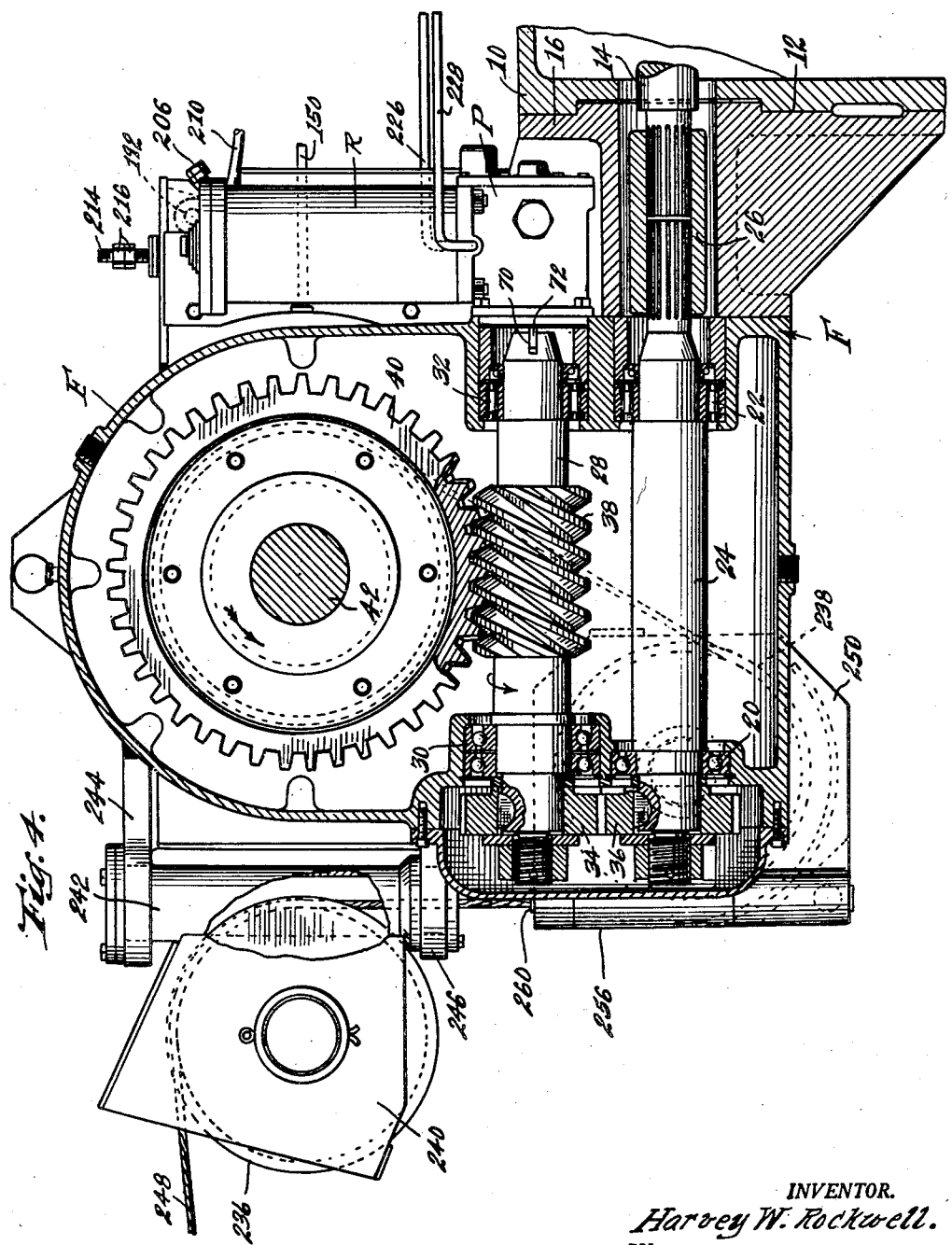

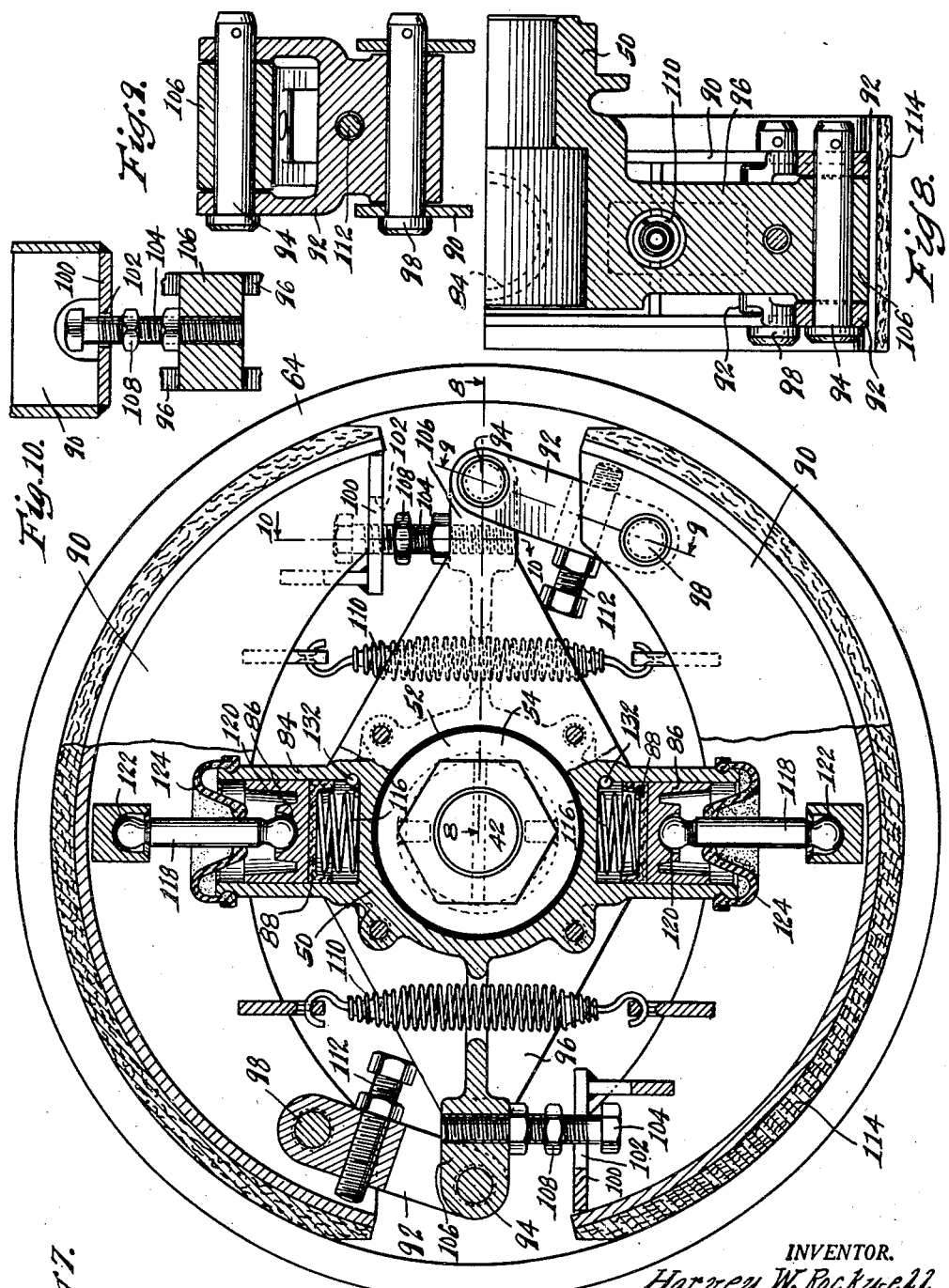

CLUTCH OFF
BRAKE ON

CLUTCH OFF
BRAKE OFF

INVENTOR.
Harvey W. Rockwell.
BY Bair & Freeman
Atty's.

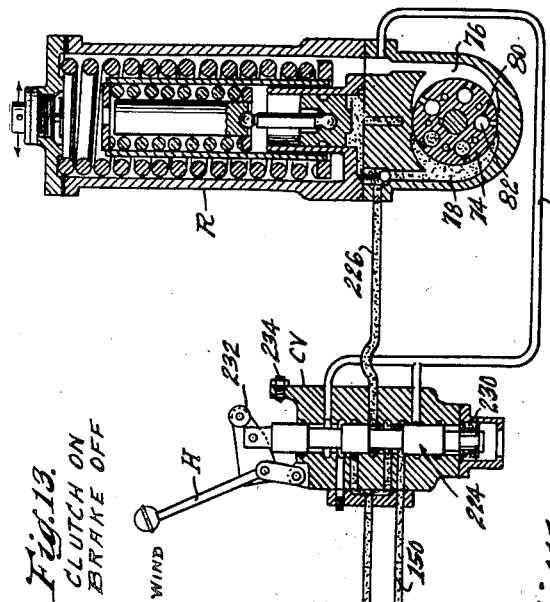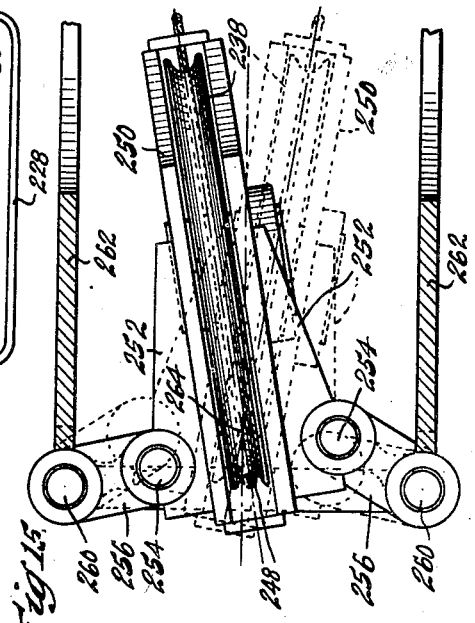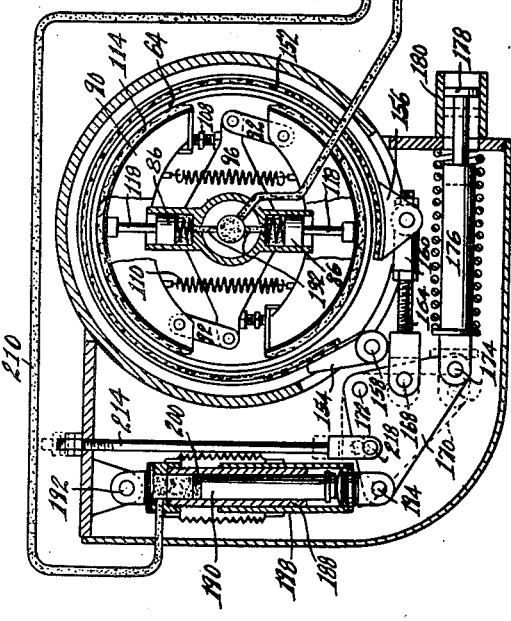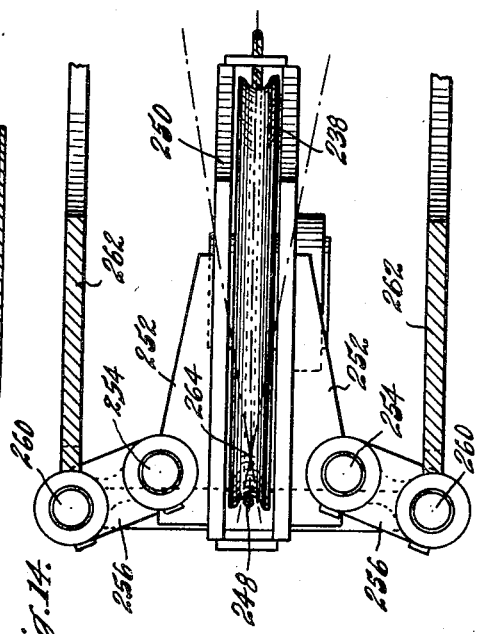

Patented May 9, 1950

2,506,842

UNITED STATES PATENT OFFICE 2,506,842

HYDRAULICALLY OPERATED CLUTCH AND BRAKE UNIT FOR WINDING REELS

Harvey W. Rockwell, Cedar Rapids, Iowa, assignor to La Plant-Choate Manufacturing Co., Inc., Cedar Rapids, Iowa, a corporation of Delaware Application January 20, 1945, Serial No. 573,786

2 Claims. (Cl. 192—17)

My present invention relates to a control unit for wire rope which unit is hydraulically operated.

One object of the invention is to provide a control unit of the winding drum type having clutch and brake control mechanisms for the rotation of the drum, which mechanisms are hydraulically operated and so inter-related to each other that a desired cycle of operation is had with respect to the time of release of the clutch and application of the brake or vice versa.

Another object is to provide a winding drum having a hydraulic clutch for effecting rotation thereof and a hydraulic brake for preventing rotation thereof, together with a means to control the rotation and non-rotation of the drum by the application of fluid pressure to the clutch and the brake when it is desirable to have the clutch on and the brake off, and to neither of them when it is desirable to have the clutch off and the brake on.

Still another object is to provide a unit of this character which may be readily controlled by a three position valve for winding and unwinding the wire rope in two positions of the control handle and for locking the wire rope against movement when the control handle is in a neutral position, to which position the handle normally returns when released.

A further object is to provide an arrangement wherein hydraulic pressure is applied to both the brake and the clutch for the purpose of shifting from a clutch-off brake-on position to a clutch-on brake-off position with the positions of the clutch shoes and the brake band being so balanced in relation to each other, and particularly by the selection of return springs for the clutch and brake in relation to each other that the clutch will be engaged at substantially the same time that the brake is released and vice versa, an adjustment being provided for effecting a slight lap of clutch engagement with brake engagement or a slight gap between the two if desired.

Still a further object is to provide a compact unitary structure which may be mounted on the end of a track-type or other type of tractor, where there is usually a power take-off shaft with which a hydraulic pump of my control unit may be operably connected, the take-off shaft also driving the drum operating shaft of the wire rope of my unit.

A further provision is an arrangement of the winding drums on opposite ends of a single axle with their hydraulic clutches and brakes readily accessible from the ends of the axle for adjustment and repairs, the drive means for the drums being located between them whereby the unit is compact and involves a minimum number of parts for its fabrication.

Additional objects are to provide a convenient and compact arrangement of operating mechanism for the hydraulic clutch and the hydraulic brake with a jack for the brake accessible by the removal of a cover from the housing of the unit; to provide the clutch operating units likewise accessible by removal of covers at the ends of the drum housing; to provide a hydraulic connection between the frame of the unit and the clutch cylinders which rotate; and to provide the unit with two drums symmetrically arranged on opposite sides of the center on which two cables may be wound for controlling two separate operations of the scraper or other device, such as one rope for raising and lowering the scraper and the other for dumping the scraper.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a rear elevation of my unit showing it mounted on a track type tractor, the tractor being shown in dotted lines as it forms no part of my present invention.

Figure 2 is a side elevation of the unit showing its relation to the rear end of the tractor.

Figure 3 is an enlarged rear elevation of the unit with the left half thereon shown in section on substantially the line 3—3 of Figure 2, showing details of the drum shaft, driving drum and clutch mechanism.

Figure 3A is an enlarged, sectional view on the line 3A—3A of Figure 3.

Figure 4 is a vertical, sectional view partially on the line 4—4 of Figure 3, showing the drive for the drum shaft, and the pump of my unit driven from the power take-off shaft of the tractor.

Figure 5 is a sectional view on the line 5—5 of Figure 3 showing further details of the clutch mechanism and of the brake mechanism, showing the clutch mechanism in disengaged position.

Figure 6 is an enlarged, sectional view of the hydraulic jack that operates the brake mechanism.

Figure 7 is a further enlarged view of the clutch mechanism showing it in engaged position.

Figures 8, 9 and 10 are sectional views on the lines 8—8, 9—9 and 10—10 respectively of Figure 7, showing further details of the clutch mechanism and particularly the linkage and adjusting means for the clutch shoes.

Figure 11:
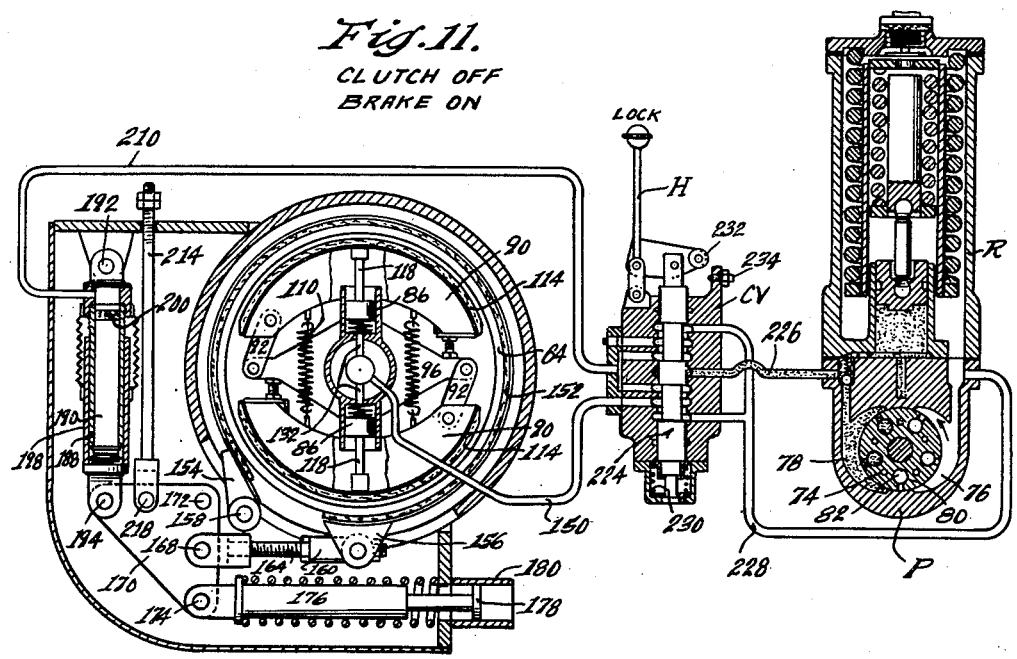
Figure 12:
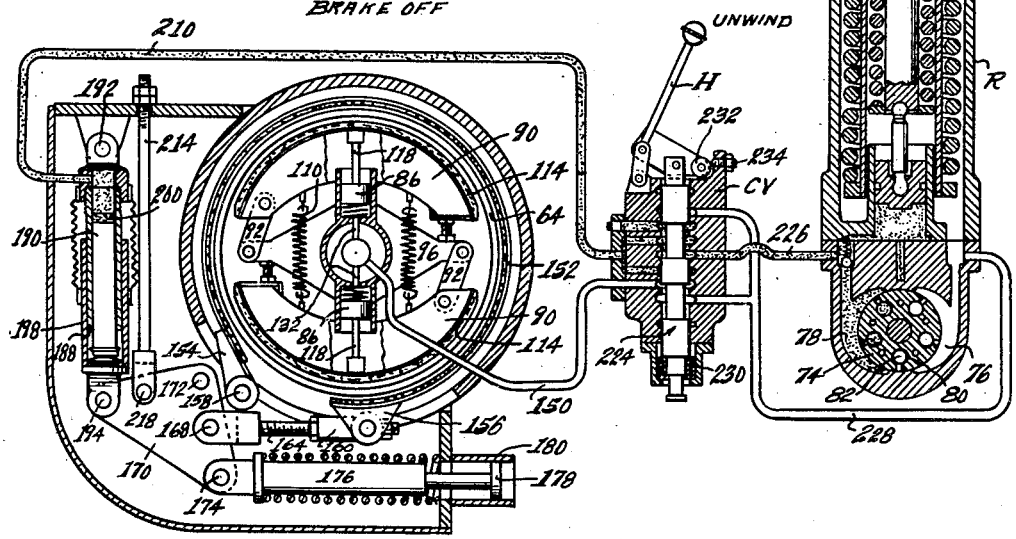

Figures 11, 12 and 13 are diagrammatic views showing three different operating steps of the control unit and the relative positions of a control valve therefor.

Figure 14 is an enlarged, sectional view on the line 14—14 of Figure 2 showing an idler sheave arrangement and Figure 15 is a similar view showing the sheave in a shifted position as when the wire rope is being wound adjacent the end of the drum as distinguished from the center thereof in Figure 14.

On the accompanying drawings I have used the reference character T to indicate in general a tractor. The tractor T has a gear housing 10 (see Figure 4) provided with an attaching face 12 for various devices designed as accessories for the tractor. A power take-off shaft 14 is driven by the engine of the tractor and projects from the housing 10.

My wire rope control unit includes a frame or housing shown generally at F, which has a flange 16 adapted to be attached to the face 12 by cap screws extended through openings 18 formed in the flange 16 to match similar threaded openings in the attaching face of the gear housing 10. Journalled in bearing 20 and 22 in the frame F is a drive shaft 24 suitably splined at its forward end to be connected by a splined sleeve 36 with a splined portion of the power take-off shaft 14.

A worm shaft 28 is journalled in bearings 30 and 32 in the frame F and has secured thereto a gear 34 meshing with a similar gear 36 on the drive shaft 24. A worm 38 is formed or mounted on the worm shaft 28 and meshes with a worm gear 40. The worm gear 40 is secured to a drum shaft 42, the shaft 42 in turn being journalled in bearings 44 of the frame F. In Figure 3, only one of these bearings is shown but the structure is symmetrical about the vertical center line and there is accordingly a bearing spaced inwardly from each end of the drum shaft. The drum shaft extends in both directions beyond these bearings and on each end a pair of bearings 46 is mounted and retained thereon against a shoulder 48 of the shaft by a cylinder supporting sleeve 50, a washer 52 and a nut 54. A spacer sleeve 56 is interposed between the two bearings 46.

Freely rotatable on the bearings 46 is a wire rope drum 58 having side flanges 60 and 62. The flange 62 terminates in a combined clutch and brake drum 64 and of course two of the wire rope drums and clutch-brake drums are provided, one for each end of the frame or housing F. The drums are closed in by end covers 66 held in position by cap screws 68.

Returning to the worm shaft 28, its forward end is bifurcated as indicated at 70, to receive a drive blade 72 of a pump P. The pump P in general includes a rotor 74, see Figure 11, an inlet port 76 and outlet port 78. The rotor has cylinders 80 in which pistons 82 are reciprocable. It is sufficient to explain for the purpose of this application that oil is taken in from a reservoir R through the intake ports 76 and discharged at high pressure into the outlet port 78 by rotation of the rotor 74 and the attendant operation of the pistons 82 and the cylinders 80.

I provide a clutch mechanism for each of the wire rope drums 58, one of which will now be described. The clutch cylinder supporting sleeve 50 has a pair of clutch cylinders 84 formed thereon diametrically opposite each other, as shown in Figure 7. In each cylinder 84 is a piston 86, backed by a cup leather 88. Clutch shoes 90 are mounted, two in each drum 64, by means of links 92. The links 92 are pivoted on pins 94, carried by arms 96 extending from the supporting sleeve 50. The links carry pins 98, each of which passes through one end of a clutch shoe 90.

The other end of the clutch shoe is provided with a flange 100 which is perforated as shown at 102. An adjusting screw 104 extends through the perforation and is threaded in a boss 106 of the arm 96 of the supporting sleeve 50. The adjusting screw 104 has a stop nut 108 to be engaged by the flange 100 when the clutch is in disengaged position, as shown in Figure 5. For effecting movement of the clutch shoes to the disengaged position, springs 110 are connected with them to pull them toward each other in the disengaged position. Adjusting screws 112, carried by the links 92 engage the brake shoes so that they are substantially equally spaced with respect to the drum 94 as shown in Figure 5. These screws may be adjusted to shift the shoes to the right or left if the spacing is not equal at both ends of the shoes. The faces of the shoes are lined with brake lining 114 for a better frictional grip between the shoes and the drum.

The springs 110 also tend to return the pistons 86 inwardly against the action of light springs 116 under them, a thrust connection being provided between the brake shoe and the piston in the form of a thrust rod 118 seated in a socket 120 of the piston and a socket 122 of the clutch shoe. Each cylinder 84 is enclosed by a neoprene or rubber diaphragm or boot 124 having a center opening snugly receiving the thrust rod 118, and its periphery contracted around the outer end of the cylinder as best shown in Figure 7.

For conveying fluid pressure to the clutch cylinders 86, I provide the following described mechanism. An end plate 126 is secured to the outer end of each cylinder supporting sleeve 50 as by cap screws 128 (see Figures 3 and 5). The end plate has radial passageways 130 communicating with ports 132 ending within the cylinders 84. The passageways 130 are formed in radial bosses 131 formed on the end plate 126. The outer ends of the passageways 130 are provided with bleeder plugs as illustrated at 134. At the center, the passageways 130 communicate with a passageway 136 (see Figure 3A) of a stud-like extension 138 of the end plate 126. On this extension a sleeve 140 is rotatably mounted with two sections of packing 142 and 144 interposed between the stud and the sleeve so as to prevent leakage at the rotatable joint. A conduit 146, has one end welded to the sleeve 140 and its other end extended through an opening 148 of the frame F (see Figure 5) where a hose 150 may be connected thereto.

A brake mechanism is provided for each clutch and brake drum 64 which is best shown in Figure 5. The brake band is preferably formed of metal as illustrated at 151. A brake lining 152 is secured thereto for greater frictional effect during the braking action. One end of the brake band 151 has a bracket 154 secured thereto and the other end has a bracket 156 secured thereto. The bracket 154 is pivoted on a stud 158 mounted stationary with respect to the frame F. A sleeve 160 is pivoted at 162 to the other bracket 156.

An adjusting screw 164 extends loosely through the sleeve 160 and is threaded into a forked connector element or yoke 166. A lock nut 167 may be utilized to retain the adjustment after it is once made. The yoke 166 is pivoted by means of a pin 168 to a triangular plate 170 which forms a bell crank pivoted to a stationary stud 172. A pivot pin 174 is carried by the downwardly extending arm of the bell crank, and a spring guide rod 176 is connected therewith. The forward end of the rod 176 has a head 178 guided in a stationary sleeve 180. A spring 182 surrounds the rod 176 and is interposed between a washer 184 against the frame F and a flange 186 on the rod. The purpose of the spring is to normally engage the brake with the drum.

For disengaging the brake from the drum, hydraulic means is provided in the form of a cylinder 188 having a plunger 190 therein. The upper end of the cylinder is pivoted to a stationary pivot pin 192 and the lower end of the plunger is operably connected with the rearwardly extending arm of the bell crank 170 by a pivot pin 194. The pivot pin 194 is carried by a yoke 196 which forms the lower end of a guide tube 198 surrounding the cylinder 188. The spring 182 tends to push the guide tube 198 upwardly and keep the yoke 196 in engagement with the lower end of the plunger 190. The upper end of the plunger has a head 200 of neoprene or the like, effecting a seal for the plunger relative to the cylinder.

The cylinder 188 is provided with a head 202 which has a perforated ear 204 for the pivot pin 192. In this head a bleeder valve 206 is provided which, after the air is bled from the cylinder, can be seated against a seat 208. A hose 210 is connected to the cylinder 202 for the purpose of introducing oil under pressure thereto as will hereinafter appear. In order to prevent dirt from entering the hydraulic mechanism for operating the brake, a flexible cylindrical bellows 212 is provided having its upper end connected with the cylinder head 202 and its lower end connected with the guide sleeve 198.

To limit the movement of the bell crank 170 to brake-released position, I provide a stop rod 214 having lock nuts 216 thereon to adjust the limit of movement. The lower end of the stop rod 214 is pivoted as at 218 to the bell crank 170 and its upper end extends loosely through an opening 220 in the frame of the machine. A resilient washer 222 may be provided to absorb the shock of stopping the motion of the bell crank.

For controlling the clutch and the brake, I illustrate in Figures 2, 11, 12 and 13, a control valve CV. Briefly the control valve CV comprises a body with a suitable porting arrangement therein, a valve plug 224 and a control handle H. Connections are made from a high pressure conduit 226 leading from the pump P, to a return conduit 228 leading back to the reservoir or pump intake, and to the clutch and brake hoses 150 and 210. The handle H normally assumes a centered or neutral position as shown in Figure 11 due to the action of a centering spring 230, but may be swung either forwardly or rearwardly as in Figures 12 and 13 respectively. As illustrated in Figure 12, it is retained in the forward position by an over-center roller 232 of rubber or similar resilient material coacting with a pointed set screw 234. The valve CV is preferably supported on the tractor T adjacent the driver's seat as by means of a bracket 231.

For each drum I provide a pair of idler sheaves 236 and 238, which are best shown in Figures 2, 3, 4, 14 and 15. The sheave 236 is mounted between side plates 240 which are welded to a tube 242 rotatable in stationary brackets 244 and 246. The wire rope illustrated at 248 extends over this sheave and down through the tube 242 to the sheave 238, extending under the last sheave and then upwardly and forwardly to wind on the drum 58, as shown by dotted lines in Figure 2. The tube 242 being rotatably mounted, permits the rope to be shifted from side to side as the machine trailing the tractor assumes different positions in relation to the tractor caused by the tractor turning in response to its steering mechanism. This keeps the rope properly reeved on the sheave 236 at all times. The sheave 238 could be similarly swivelled but I prefer to use a different and novel construction due to the limitations of space. This construction will now be described.

Referring to Figure 14, the sheave 238 is journalled in side plates 250. Brackets 252 are secured to the side plates as by welding and carry pivot pins 254. Links 256 are pivoted on the pins 254 and on other pins 260. The pins 260 are supported by side plates 262 forming rigid parts of the frame F. The linkage arrangement is such that the sheave 238 will pivot about a movable center point approximately coincident with the portion of the rope 248 which extends downwardly from the sheave 236 to the sheave 238. Actually the point just mentioned moves as the sheave pivots in the rigion immediately surrounding a point indicated at 264 in Figure 14. Figure 15 illustrates in full lines how the sheave may swing toward the left and in dotted lines toward the right to secure this action, the linkage arrangement thus eliminating the necessity of using the journalled tube arrangement as for the sheave 236. This arrangement also eliminates any mechanism for pivoting the sheave in the space back of the sheave thus minimizing rearward projection of the unit.

*Practical operation*

The operation of my control unit may be best explained by reference to Figures 11, 12 and 13. The handle H is shown in the neutral or "lock" position which, through the control valve CV, connects the hoses 150 and 210 hydraulically with the return conduit 228 so that the clutch springs 110 force the pistons 86 inwardly and the brake spring 182 forces the plunger 190 inwardly, thus forcing oil from the cylinders 84 and 188 into the reservoir R. This permits the brake spring to keep the brake in applied position, whereas the clutch is disengaged and the wire rope is locked against being pulled outwardly from the control unit. In other words, the clutch is off and the brake is on as indicated in the legend adjacent Figure 11.

If it is now desirable to pay out the rope, the clutch must remain off and the brake must be released. This is accomplished by pushing the handle H forwardly (or to the right in Figure 12) thereupon connecting the high pressure conduit 226 from the pump P with the hose 210 leading to the brake cylinder, leaving the clutch still released (by hydraulic connection between the hose 150 and the return conduit 228) as it was in Figure 11. The handle H will stay in the forward position illustrated if the handle is let go of and this is desirable as the operator may have other duties to attend to during the paying out of the rope. If he doesn't wish the handle to stay in this position, but on the other hand wishes to only momentarily pay out the rope and then return to brake-on position again when he releases the handle, he doesn't push the handle forwardly far enough for the roller 232 to pass the point of the set screw 234, but merely to contact with its point.

In order to wind the rope on the drum, the handle H is moved to the position of Figure 13 which connects the conduit 226 from the outlet of the pump P to both of the hoses 150 and 210, thereby engaging the clutch and releasing the brake at the same time by the introduction of fluid pressure into both the clutch cylinders and the brake cylinder. During this operation it is usually desirable to have the clutch engage at the instant the brake disengages so that there will be no drag of the clutch shoes in opposition to the drag of the brake or vice versa, and so that there will be no "free wheeling" period between disengagement of the one and engagement of the other. This is nicely accomplished in a hydraulic system of the character disclosed because the operation of one can be balanced against the operation of the other by the proper selection of relative sizes for the clutch and brake springs 110 and 182, and proper adjustment of the screw 164, as well as selection of relative brake and clutch cylinder diameters.

Under all operating conditions, since the valve CV supplies fluid pressure to the hoses 150 and 210 simultaneously, it will make no difference at what value the pressure is supplied, as the same pressure goes to both the clutch cylinders and the brake cylinder. The movement of the pistons in the cylinders are thus subject to the fluid pressure as balanced against the clutch and brake springs opposing movement of the pistons by the fluid pressure. Thus for any given pressure there is a given position of the clutch shoes and the brake band. After adjustment is once made the desired operation will therefore occur regardless of wear in the parts as the resistance of the springs remains the same and in operation the clutch shoes and the brake band start to function only when the spring resistance is overcome. The adjustment 164 may be altered to provide very slight overlap of the clutch and brake engagement or a gap between them depending upon the desires of the operator, if he doesn't want absolute simultaneousness of clutch disengagement upon brake engagement and vice versa. By the use of a hydraulic arrangement as herein disclosed, slight difference due to mechanical adjustments are eliminated and after adjustment is once made, the operator can be assured of the desired operation thereafter each time the unit functions regardless of the oil pressure in the system.

From the foregoing specification, it will be obvious that I have provided for a hydraulic connection between the clutch and brake which may be made in a comparatively simple manner by the structure disclosed on the drawings. While I have described but one control valve, there of course would be two of them side by side, one for each drum in the wire rope control unit. Thus one control valve can be manipulated for controlling the raising and lowering of a scraper and the other for controlling the dumping thereof, or for any other two operations involved in any type of machine trailing the tractor. The operation of the unit is comparatively simple, involving the use of the handle H and the three positions thereof as distinguished from individual clutch and brake mechanisms as on some machines that are controlled independent of each other and rely on co-ordination produced by the operator for the change from a braking condition to an operating condition. The skill required for operation of my unit is reduced to a minimum due to the hydraulic operating relation had between the clutch and brake mechanisms.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a control unit of the character described, a reel shaft, means for driving the reel shaft, a reel rotatable on said reel shaft and comprising a friction drum, and a clutch and a brake adapted to engage said friction drum, hydraulic means for effecting engagement of said clutch with the friction drum, spring means for disengaging said clutch therefrom, spring means for effecting engagement of said brake with the friction drum, hydraulic means for disengaging said brake from the friction drum, means for simultaneously introducing fluid pressure to both of said hydraulic means to simultaneously engage said clutch and disengage said brake and vice versa, said last means including a single conduit for each of said hydraulic means for conveying hydraulic fluid thereto, said clutch including a shoe member and a movable member for effecting engagement and disengagement of the shoe member with said friction drum, said first spring means and first hydraulic means being connected to said movable member to impart movement thereto, a cylindrical stud secured to a portion of the hydraulic means for operating said clutch, passageways in said stud for said hydraulic fluid, and a conduit connecting member on said stud in fluid tight sealing engagement therewith, said stud being rotatable relative to said conduit connecting member, said single conduit for said first hydraulic means being connected to said conduit connecting member to convey hydraulic fluid to the passageways in the stud.

2. In a control unit of the character described, a reel shaft, means for driving the reel shaft, a reel rotatable on said reel shaft and comprising a friction drum, and a clutch and a brake adapted to engage said friction drum, hydraulic means for effecting engagement of said clutch with the friction drum, spring means for disengaging said clutch therefrom, spring means for effecting engagement of said brake with the friction drum, hydraulic means for disengaging said brake from the friction drum, means for simultaneously introducing fluid pressure to both of said hydraulic means to simultaneously engage said clutch and disengage said brake and vice versa, said last means including a single conduit for each of said hydraulic means for conveying hydraulic fluid thereto, said clutch including a shoe member and a movable member for effecting engagement and disengagement of the shoe member with said friction drum, said first spring means and first hydraulic means being connected to said movable member to impart movement thereto, a cylindrical projection secured to a portion of the hydraulic means for operating said clutch, passageways for hydraulic fluid in said portion of the hydraulic means for operating said clutch, an axial passageway in said cylindrical projection communicating with said passageways in said portion of the hydraulic means for operating said clutch, and a sleeve member, said projection being rotatable relative to said sleeve member, and a radially extending passageway in said sleeve member in communication with said axial passageway in said projection, said single conduit for said first hydraulic means being connected to said radially extending passageway in said sleeve member.

HARVEY W. ROCKWELL.

REFERENCES CITED

The following references are of record in the file of this patent:

UNITED STATES PATENTS

| Number | Name | Date |
| --- | --- | --- |
| 2,138,824 | Yount | Dec. 6, 1938 |
| 2,220,517 | Friedman | Nov. 5, 1940 |
| 2,221,014 | Williamson | Nov. 12, 1940 |
| 2,256,982 | Lawler | Sept. 23, 1941 |
| 2,272,917 | Lawler | Feb. 10, 1942 |
| 2,279,597 | Selmer | Apr. 14, 1942 |
| 2,312,552 | Hutchins | Mar. 2, 1943 |
| 2,317,171 | Berby | Apr. 20, 1943 |
| 2,402,052 | Johansen | June 11, 1946 |